Patented Dec. 28, 1943

2,337,599

UNITED STATES PATENT OFFICE 2,337,599

METHOD OF RENDERING CLAYS FILTERABLE

Flemmon P. Hall, Syracuse, N. Y., assignor to Onondaga Pottery Company, Syracuse, N. Y., a corporation of New York No Drawing. Application October 29, 1941, Serial No. 417,011

2 Claims. (Cl. 210—62)

My present invention relates to the preparation of clays for use in the arts, particularly in the manufacture of certain ceramics and of coatings for papers, and provides a method by which alkaline clays may be rendered filterable.

Heretofore in the purification of kaolins it has been common practice to deflocculate the clay slip with such deflocculants as sodium silicate, sodium carbonate, ammonia, etc., and allow the coarse particles along with the impurities, such as flint and feldspar, to settle out. After the coarse fraction has settled, the suspended clay is withdrawn from the tank. In this condition it has not been possible to filter slips as long as the water is alkaline because the clay particles are too small to be retained by the filter and therefore it has been customary to add a flocculant such as alum which produces settling of the clay and facilitates filtering.

I have discovered that alkaline slips, particularly those made from or containing high gel-forming clay such as hard Georgia kaolin, which have been deflocculated by means of sodium hydroxide and potassium carbonate, can be filtered successfully if acetate ions are present in small numbers, particularly if the slip is heated somewhat. In practice I add either an acetate such as ammonium acetate or acetic acid and ammonia in proportions such that the acetate ions shall be from 0.05 to 5% on the basis of the solids in the slip and I heat the slip to from 100° to 140° F. before filtering. Such a slip is still alkaline but will filter satisfactorily.

A specific example of the procedure which I employ is as follows:

Example A 5 kilograms of crude hard Georgia kaolin was dispersed in 25 kilograms of water by means of agitation and with the help of the addition of 25 grams of sodium hydroxide. Settling tests served to indicate the complete deflocculation of the clay. The settlings were removed and 15 grams of 28% commercial acetic acid added to the suspension and the slip heated to a temperature of 110° F.; and placed in the pressure chamber of a small laboratory filter press. The air pressure was turned on and the filtration started. In about 8 hours, the filtration was complete and an examination of the filter-press cakes showed them to be hard and firm. Tests showed that the filtrate was alkaline (pH 10.4 in this case). Without acetate ions being present, the above filtration is impossible with the conventional types of filter press equipment, as long as the filtrate is on the basic side of the neutral point.

Example B 5 kilograms of washed hard Georgia kaolin was dispersed in 25 kilograms of water by means of a high-speed stirrer, and the addition of 25 cc. of concentrated ammonia. 10 grams of sodium acetate were added and the slip heated to 120° F. and placed in the pressure chamber of a small laboratory filter press. The air pressure was turned on and a clear filtrate was obtained. The filtration was complete in seven hours. Without the presence of acetate ions and the application of heat, the filtrate would have been very turbid and the loss of material considerable. The filtration would have been impossible as far as the fine fraction of the clay is concerned.

My improved process about halves the filtering time, and reduces the loss of material substantially.

I claim:

1. That step in the manufacture of alkaline deflocculated slips of kaolin or gel-forming clay minerals which comprises filtering the slips to which acetate ions have been added in amounts from 0.05 to 5 percent of the solids in the slips.

2. That step in the manufacture of alkaline deflocculated slips of kaolin or gel-forming clay minerals which includes in adding acetate ion forming materials in amounts from 0.05 to 5% of the solids in the slips, and filtering the slips.

FLEMMON P. HALL.